United States Patent
Hsieh et al.

(10) Patent No.: US 10,492,258 B2
(45) Date of Patent: Nov. 26, 2019

(54) SLOW-START PHOTOCURING DEVICE AND SWITCH CONTROL MODULE THEREOF

(71) Applicant: COSMEX CO., LTD., New Taipei (TW)

(72) Inventors: Wan Chieh Hsieh, New Taipei (TW); Hao-Hong Ciou, New Taipei (TW); Lin-Yu Sia, New Taipei (TW); Chun Ching Liu, New Taipei (TW)

(73) Assignee: Cosmex Co., Ltd., New Taipei (TW)

( * ) Notice: Subject to any disclaimer, the term of this patent is extended or adjusted under 35 U.S.C. 154(b) by 0 days.

(21) Appl. No.: 15/952,619

(22) Filed: Apr. 13, 2018

(65) Prior Publication Data
US 2018/0302967 A1    Oct. 18, 2018

(30) Foreign Application Priority Data
Apr. 14, 2017    (TW) .............................. 106205239 U

(51) Int. Cl.
*H05B 33/08*    (2006.01)
*A45D 31/00*    (2006.01)

(52) U.S. Cl.
CPC .......... *H05B 33/0845* (2013.01); *A45D 31/00* (2013.01); *H05B 33/0818* (2013.01)

(58) Field of Classification Search
CPC .... A54D 31/00; A54D 29/00; H05B 33/0806; H05B 33/0809; H05B 33/0815; H05B 33/0818; A45D 31/00; A45D 29/00
See application file for complete search history.

(56) References Cited

U.S. PATENT DOCUMENTS

| | | | | |
|---|---|---|---|---|
| 2009/0073271 A1* | 3/2009 | Grenlund | ............. | H04N 5/2251 348/211.8 |
| 2009/0160364 A1* | 6/2009 | Ackermann | ....... | H05B 33/0818 315/294 |
| 2009/0190349 A1* | 7/2009 | Middlemass | ........ | G02B 6/4296 362/240 |
| 2011/0277338 A1* | 11/2011 | Li | ............................. | F26B 3/28 34/275 |
| 2011/0300505 A1* | 12/2011 | Jessop | ................ | A61C 19/003 433/29 |
| 2015/0184938 A1* | 7/2015 | Tanihara | ................ | A45D 29/00 34/245 |
| 2016/0374167 A1* | 12/2016 | Aliakseyeu | ........ | H05B 33/0845 |

* cited by examiner

*Primary Examiner* — David E Smith
(74) *Attorney, Agent, or Firm* — Muncy, Geissler, Olds & Lowe, P.C.

(57) ABSTRACT

The present invention is to provide a slow-start photocuring device, comprising: a housing, one or a plurality of UV LED modules, and a switch control module connected to the one or the plurality of UV LED modules. The housing has an inner side provided with an internal cavity, wherein the inner side of the housing is further provided with one or a plurality of openings in one or two sides of the internal cavity. The one or the plurality of UV LED modules provided around the internal cavity, wherein each of the one or the plurality of UV LED modules has a light-emitting side facing the internal cavity. The switch control module comprises a signal modulator, and the signal modulator activates a power buffer mode when receiving a trigger signal, in order to modulate an irradiation power of the one or the plurality of UV LED modules gradually from a first level to a second level.

12 Claims, 3 Drawing Sheets

SLOW-START PHOTOCURING DEVICE AND SWITCH CONTROL MODULE THEREOF

BACKGROUND OF THE INVENTION

1. Technical Field

The present invention relates to a photocuring device and more particularly to a slow-start photocuring device for photocurable artificial fingernails.

2. Description of Related Art

Photocurable artificial fingernails are imitation fingernails formed by curing a photocurable gel with ultraviolet (UV) light. Made of natural resins, such photocurable gels not only can protect the nail surface, but also can form a protective layer that adds to the thickness of the underlying natural nails, thereby keeping the natural nails from cracking or breaking. Photocurable artificial nails can also be used to correct nail shapes and beautify natural nails effectively. Two major advantages of photocurable artificial nails are eco-friendliness and harmlessness to human health. No irritating smell is produced during the photocuring process, and the reinforced nails can be polished with ease, are less likely to curl than in their natural state, and have a visually pleasing sheen.

However, some gels tend to react with the light of UV light-emitting diodes (LEDs) and generate a considerable amount of heat. If the light is output at full power during the entire curing process, gel temperature may rise abruptly, causing a burning or otherwise uncomfortable sensation in the fingers involved. The inventor of the present invention found it necessary to provide a solution to the aforesaid problem.

SUMMARY OF THE INVENTION

One objective of the present invention is to solve the problem of the conventional photocuring devices that sustained high-power irradiation may cause certain gels to generate heat that brings about a burning or otherwise uncomfortable sensation in a user's fingers.

To achieve the foresaid objective, the present invention provides a slow-start photocuring device, comprising: a housing, one or a plurality of UV LED modules, and a switch control module connected to the one or the plurality of UV LED modules. The housing has an inner side provided with an internal cavity, wherein the inner side of the housing is further provided with one or a plurality of openings in one or two sides of the internal cavity. The one or the plurality of UV LED modules provided around the internal cavity, wherein each of the one or the plurality of UV LED modules has a light-emitting side facing the internal cavity. The switch control module has a power buffer unit, and when the switch control module is triggered, an output of the switch control module is loaded on the power buffer unit in order for the power buffer unit to change an irradiation power of the one or the plurality of UV LED modules gradually from a first level to a second level over a time period.

Further, the power buffer unit is a resistor-capacitor (RC) circuit, a resistor-inductor (RL) circuit, or digital potentiometer.

Another objective of the present invention is to provide a slow-start photocuring device, comprising: a housing, one or a plurality of UV LED modules, and a switch control module connected to the one or the plurality of UV LED modules. The housing has an inner side provided with an internal cavity, wherein the inner side of the housing is further provided with one or a plurality of openings in one or two sides of the internal cavity. The one or the plurality of UV LED modules provided around the internal cavity, wherein each of the one or the plurality of UV LED modules has a light-emitting side facing the internal cavity. The switch control module comprises a signal modulator, and the signal modulator activates a power buffer mode when receiving a trigger signal, in order to modulate an irradiation power of the one or the plurality of UV LED modules gradually from a first level to a second level.

Further, the signal modulator is a pulse width modulator (PWM), the pulse width modulator adjusts a duty cycle or a frequency of a current output during a time period in order to increase the irradiation power continuously, and after the time period ends, the pulse width modulator keeps the irradiation power at a constant level or reduces the irradiation power to zero.

Further, the signal modulator is a pulse width modulator (PWM), the pulse width modulator adjusts a duty cycle or a frequency of a current output during a time period in order to reduce the irradiation power continuously, and after the time period ends, the pulse width modulator keeps the irradiation power at a constant level or reduces the irradiation power to zero.

Further, the signal modulator is an amplitude modulator, the amplitude modulator adjusts a magnitude and a duration of a current output during a time period in order to increase the irradiation power continuously, and after the time period ends, the amplitude modulator keeps the irradiation power at a constant level or reduces the irradiation power to zero.

Further, the signal modulator is an amplitude modulator, the amplitude modulator adjusts a magnitude and a duration of a current output during a time period in order to reduce the irradiation power continuously, and after the time period ends, the amplitude modulator keeps the irradiation power at a constant level or reduces the irradiation power to zero.

Another objective of the present invention is to provide a switch control module of a photocuring device, wherein the switch control module is provided on the photocuring device and is connected to an ultraviolet (UV) light-emitting diode (LED) module of the photocuring device to control an irradiation power of the UV LED module, the switch control module comprising a power buffer unit, wherein when the switch control module is triggered, an output of the switch control module is loaded on the power buffer unit in order for the power buffer unit to change the irradiation power of the UV LED module gradually from a first level to a second level over a time period.

Further, the power buffer unit is a resistor-capacitor (RC) circuit, a resistor-inductor (RL) circuit, or digital potentiometer.

Another objective of the present invention is to provide a switch control module of a photocuring device, wherein the switch control module is provided on the photocuring device and is connected to an ultraviolet (UV) light-emitting diode (LED) module of the photocuring device to control an irradiation power of the UV LED module, the switch control module comprising a signal modulator, wherein the signal modulator activates a power buffer mode when receiving a trigger signal, in order to modulate the irradiation power of the UV LED module gradually from a first level to a second level.

Further, the signal modulator is a pulse width modulator (PWM), the pulse width modulator adjusts a duty cycle or a frequency of a current output during a time period in order to increase the irradiation power continuously, and after the time period ends, the pulse width modulator keeps the irradiation power at a constant level or reduces the irradiation power to zero.

Further, the signal modulator is a pulse width modulator (PWM), the pulse width modulator adjusts a duty cycle or a frequency of a current output during a time period in order to reduce the irradiation power continuously, and after the time period ends, the pulse width modulator keeps the irradiation power at a constant level or reduces the irradiation power to zero.

Further, the signal modulator is an amplitude modulator, the amplitude modulator adjusts a magnitude and a duration of a current output during a time period in order to increase the irradiation power continuously, and after the time period ends, the amplitude modulator keeps the irradiation power at a constant level or reduces the irradiation power to zero.

Further, the signal modulator is an amplitude modulator, the amplitude modulator adjusts a magnitude and a duration of a current output during a time period in order to reduce the irradiation power continuously, and after the time period ends, the amplitude modulator keeps the irradiation power at a constant level or reduces the irradiation power to zero.

Therefore, the present invention has the following beneficial effects compared with the prior art:

1. The photocuring device of the present invention allows its irradiation power to be modulated, or more particularly allows its UV LED modules to light up gradually, to dim gradually, to dim gradually after lighting up gradually, or to light up gradually after dimming gradually. Thus, prolonged high-power irradiation will not result in a burning or otherwise uncomfortable sensation in the fingers involved.

2. The photocuring device of the present invention can prevent excessive change in instantaneous power, lest a user feel uncomfortable.

DETAILED DESCRIPTION OF THE INVENTION

The details and technical solution of the present invention are hereunder described with reference to accompanying drawings. For illustrative sake, the accompanying drawings are not drawn to scale. The accompanying drawings and the scale thereof are not restrictive of the present invention.

Figure 1:
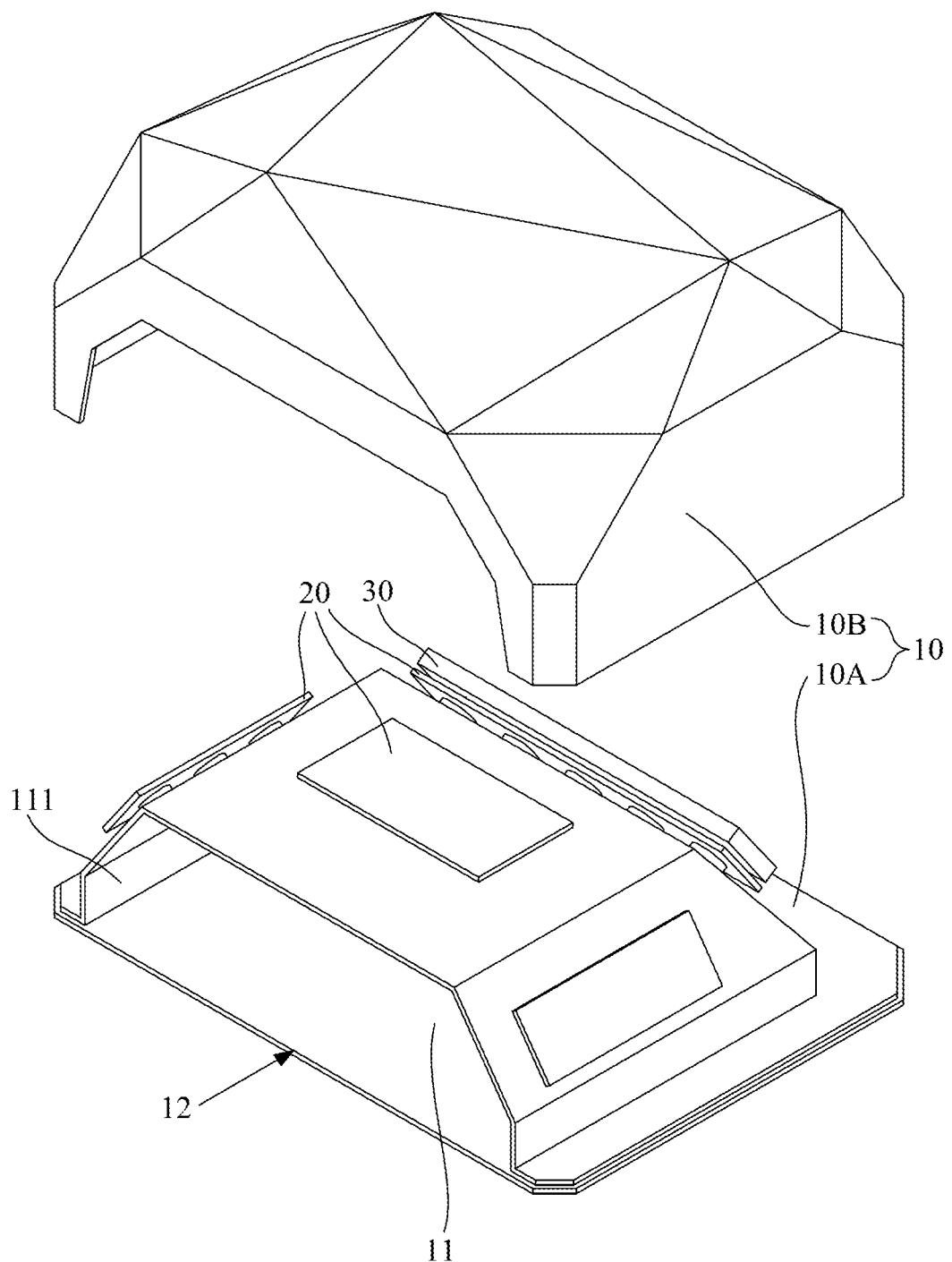
FIG. 1 shows an external perspective schematic view of a photocuring device of the present invention.

Please refer to FIG. 1 for a perspective view of a photocuring device according to the present invention.

As shown in FIG. 1, the photocuring device 100 includes a housing 10, one or a plurality of UV LED modules 20 provided in the housing 10, and a switch control module 30 provided in the housing 10 and connected to the one or the plurality of UV LED modules 20. Here, a plurality of UV LED modules 20 are provided by way of example.

The housing 10 includes an inner housing portion 10A and an outer housing portion 10B. The inner housing portion 10A and the outer housing portion 10B form a space therebetween in which the UV LED modules 20 and the switch control module 30 are provided. The inner housing portion 10A extends inward of the housing 10 to form an internal cavity 11. The internal cavity 11 has an opening 12 on one side so that a user's fingers can be placed into the opening. In another preferred embodiment, the inner housing portion is arch-shaped and is bilaterally provided with openings that are in communication with the internal cavity, allowing a user's fingers to extend into the internal cavity from two lateral sides. The present invention has no limitation on the shape of the inner housing portion or the number or arrangement of the aforesaid openings.

The internal cavity 11 is peripherally provided with a plurality of walls 111, and the walls 111 are formed with a plurality of through holes (not shown) so that the light-emitting sides the UV LED modules 20 provided around the internal cavity 11 can project light into the internal cavity 11 through the through holes.

The switch control module 30 may be a circuit board and the circuits and electronic components integrated with the circuit board. In another preferred embodiment, the switch control module 30 may be two or more circuit boards and the circuits and electronic components integrated with the circuit boards, wherein some of the electronic components or circuits are integrated with more than one circuit board. The present invention has no limitation on the configuration of the switch control module 30. The switch control module 30 is connected to the UV LED modules 20 to provide electricity to, and control the light-emitting mode of, the UV LED modules 20.

In order for the UV LED modules 20 to light up gradually when activated, the switch control module 30 in the present invention can adjust the light emission power of the UV LED modules 20 either through a circuit or through a signal modulator that can directly control the output mode of the power source, as explained below with reference to two different embodiments respectively.

Figure 2:
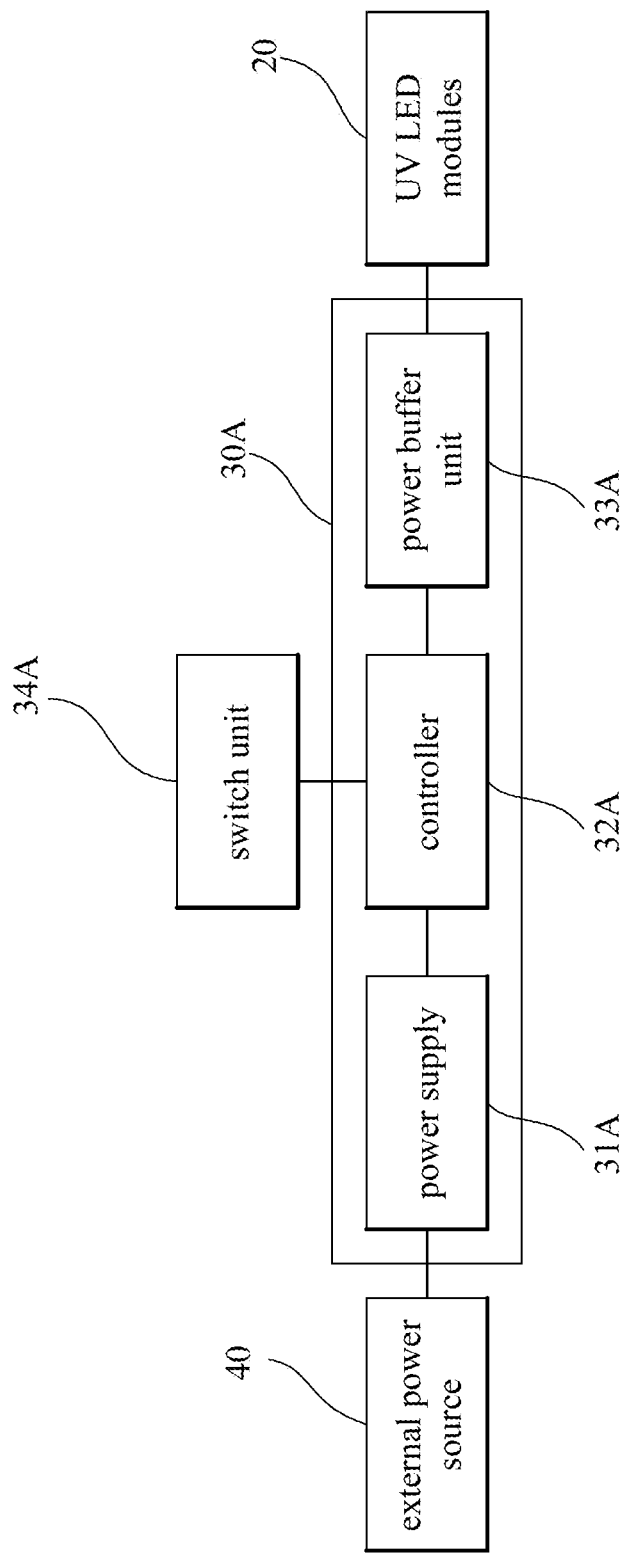
FIG. 2 shows a block diagram of the first embodiment of the present invention.

Please refer to FIG. 2 for a block diagram of the first embodiment of the present invention.

The switch control module 30A in this embodiment essentially includes a power supply 31A, a controller 32A provided at the rear end of the power supply 31A, and a power buffer unit 33A provided at the rear end of the controller 32A.

The power supply 31A is connected to an external power source 40. In one preferred embodiment, the power supply 31A is integrated with a rectifier and filter unit, a power factor correction unit, a transformer, a power modulation unit, or other similar power supply circuits; the present invention has no limitation in this regard. In another preferred embodiment, the power supply 31A is implemented as an external transformer or power adapter; the present invention has no limitation in this regard, either.

The controller 32A is connected to a switch unit 34A and can be triggered by the switch unit 34A in order to supply or not to supply electricity to the UV LED modules 20. More specifically, the switch unit 34A may be an input device such as a physical press-button to be pressed by a user or a touch control button, or a wireless transmission unit connected to the controller 32A so that a user can control the controller 32A through wireless transmission; the present invention has no limitation in this regard. When receiving a trigger signal from the switch unit 34A, the controller 32A activates the UV LED modules 20 and begins to supply electricity thereto. The controller 32A uses a timer (not shown) to time the duration of light emission, and when the duration reaches a predetermined limit, the controller 32A turns off the UV LED modules 20 automatically. In one preferred embodiment, the controller 32A pre-stores a plurality of power levels (or voltage or current levels) so that during the activation process, the controller 32A can switch between the power levels according to the time of the timer, thereby adjusting the irradiation power of the UV LED modules 20. In another preferred embodiment, the controller 32A can force the UV LED modules 20 into a turned-off state when receiving another trigger signal from the switch unit 34A.

The power buffer unit 33A is provided between the controller 32A and the UV LED modules 20. The power buffer unit 33A is configured to buffer the electricity provided by the power supply 31A and thus gradually change the irradiation power of the UV LED modules 20 from a first level to a second level over a certain time period. More specifically, the power buffer unit 33A may be a resistor-capacitor (RC) circuit, a resistor-inductor (RL) circuit, or other similar buffer circuits; the present invention has no limitation in this regard. When the controller 32A is triggered by the switch unit 34A, the voltage or current output by the controller 32A (at a preset power, voltage, or current level) is loaded on the RC or RL circuit in order to for the RC or RL circuit to increase the time required for the power of the UV LED modules 20 to reach the second level from the first level and stabilize at the second level, wherein the time required is determined by the properties of the capacitor or inductor in the RC or RL circuit. Apart from the foregoing configuration, the power buffer unit 33A may be a digital potentiometer for reducing or increasing the resistance of a load resistor, thereby effecting a gradual increase or decrease of the irradiation power of the UV LED modules 20 respectively.

By modulating the irradiation power of the UV LED modules 20 according to the plural power levels preset into the controller 32A, the brightness of the UV LED modules 20 can be varied, e.g., can be gradually increased, gradually decreased, gradually increased and then gradually decreased, or gradually decreased and then gradually increased. This allows a photocurable gel to be cured under a suitable condition while discomfort associated with a drastic change in the irradiation power is effectively prevented.

Figure 3:
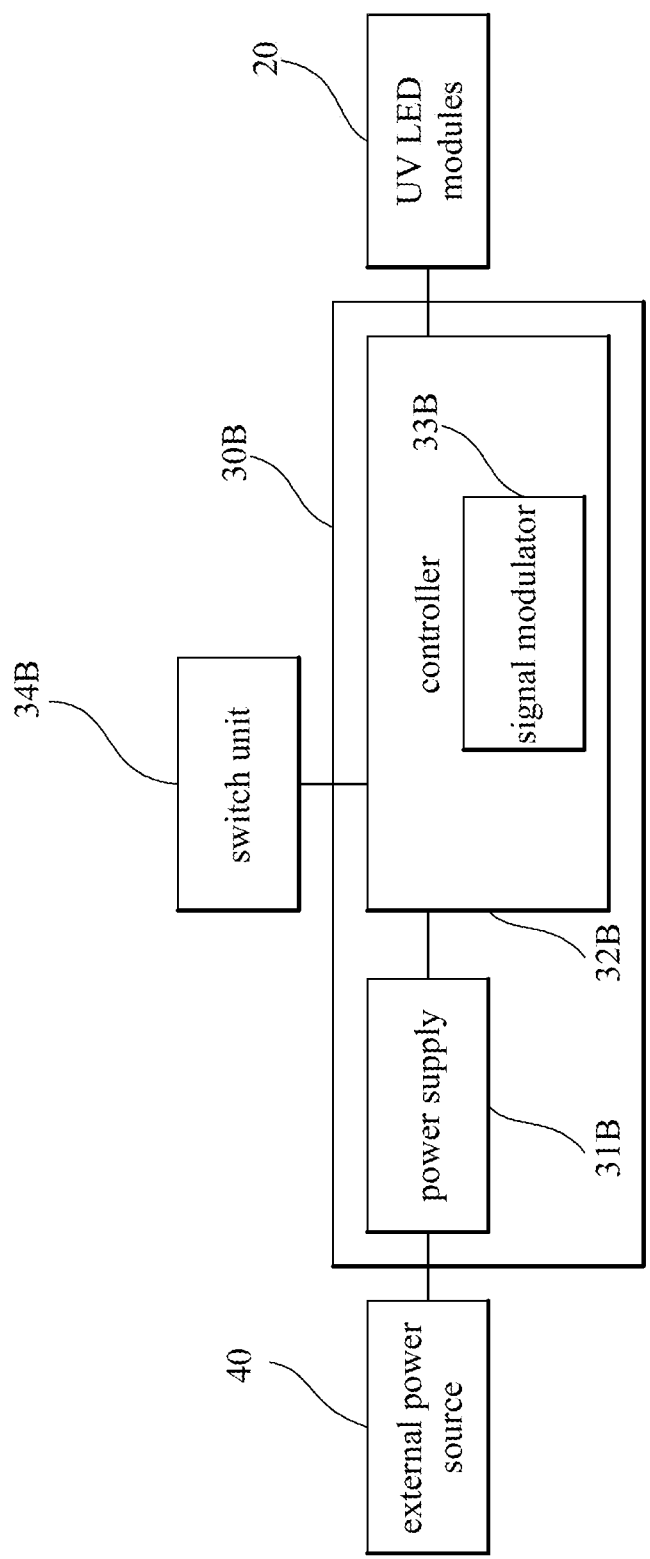
FIG. 3 shows a block diagram of the second embodiment of the present invention.

Aside from modulating the irradiation power through circuit control, a signal modulator is used in another preferred embodiment of the present invention to directly control the output mode of the power source and thereby adjust the light emission power of the UV LED modules 20. Please refer to FIG. 3 for a block diagram of the second embodiment of the present invention.

In this embodiment, the switch control module 30B includes a power supply 31B, a controller 32B provided at the rear end of the power supply 31B, and a signal modulator 33B constructed together with the controller 32B to form a single processor.

The power supply 31B is connected to an external power source 40. In one preferred embodiment, the power supply 31B is integrated with a rectifier and filter unit, a power factor correction unit, a transformer, a power modulation unit, or other similar power supply circuits; the present invention has no limitation in this regard. In another preferred embodiment, the power supply 31B is implemented as an external transformer or power adapter; the present invention has no limitation in this regard, either.

The controller 32B is connected to a switch unit 34B and can be triggered by the switch unit 34B in order to supply or not to supply electricity to the UV LED modules 20. More specifically, the switch unit 34B may be an input device such as a physical press button or a touch control button to be pressed by a user, or a wireless transmission unit connected to the controller 32B so that a user can control the controller 32B through wireless transmission; the present invention has no limitation in this regard. When receiving a trigger signal from the switch unit 34B, the controller 32B activates the UV LED modules 20 and begins to supply electricity thereto. The controller 32B uses a timer (not shown) to time the duration of light emission, and when the duration reaches a predetermined limit, the controller 32B turns off the UV LED modules 20 automatically. In another preferred embodiment, the controller 32B can force the UV LED modules 20 into a turned-off state when receiving another trigger signal from the switch unit 34B.

The signal modulator 33B, which is constructed together with the controller 32B to form a single processor, activates a power buffer mode when receiving a trigger signal from the controller 32B, in order to modulate the irradiation power of the UV LED modules 20 gradually from a first level to a second level. More specifically, the signal modulator 33B may be an amplitude modulator or a pulse width modulator (PWM) and is configured to receive a power signal and then modulate the power signal by increasing or decreasing its power level to a predetermined one at a preset rate. To increase or decrease the irradiation power continuously, amplitude modulation can be carried out by controlling the magnitude and duration of current output, or PMW can be conducted by controlling the duty cycle or frequency of current output. In another preferred embodiment, the signal modulator 33B and the controller 32B are implemented by separate processors respectively. The present invention has no limitation on whether the signal modulator 33B and the controller 32B are integrated.

According to the above, the irradiation power of the UV LED modules 20 can be continuously increased or decreased at a predetermined rate based on the plural power levels preset in the controller 32B or the signal modulator 33B and, once a predetermined time period has passed, be kept at a constant level or reduced to zero. Through the foregoing operations, the brightness of the UV LED modules 20 can be changed, e.g., can be gradually increased, gradually decreased, gradually increased and then gradually decreased, or gradually decreased and then gradually increased. This not only allows a photocurable gel to be cured under a suitable condition, but also effectively prevents discomfort which may otherwise result from a drastic change in the irradiation power.

As above, the photocuring device of the present invention allows its irradiation power to be modulated, or more particularly allows its UV LED modules to light up gradually, to dim gradually, to dim gradually after lighting up gradually, or to light up gradually after dimming gradually. Thus, prolonged high-power irradiation will not result in a burning or otherwise uncomfortable sensation in the fingers involved. Moreover, the photocuring device of the present invention can prevent excessive change in instantaneous power, lest a user feel uncomfortable.

While the present invention has been described in connection with certain exemplary embodiments, it is to be understood that the invention is not limited to the disclosed embodiments, but, on the contrary, intended to cover various modifications and equivalent arrangements included within the spirit and scope of the appended claims and equivalents thereof.

What is claimed is:

1. A slow-start UV nail lamp, comprising:
 a housing having an inner side provided with an internal cavity, wherein the inner side of the housing is further provided with one or a plurality of openings on one or two sides of the internal cavity;

one or a plurality of ultraviolet (UV) light-emitting diode (LED) modules provided around the internal cavity, wherein each of the one or the plurality of UV LED modules has a light-emitting side facing the internal cavity; and a switch control module connected to the one or the plurality of UV LED modules, wherein the switch control module has a power buffer unit, and when the switch control module is triggered, an output of the switch control module is loaded on the power buffer unit in order for the power buffer unit to change an irradiation power of the one or the plurality of UV LED modules gradually from a first level to a second level over a time period, wherein the power buffer unit is a resistor-capacitor (RC) circuit, a resistor-inductor (RL) circuit, or digital potentiometer.

2. A slow-start UV nail lamp, comprising:

a housing having an inner side provided with an internal cavity, wherein the inner side of the housing is further provided with one or a plurality of openings in one or two sides of the internal cavity;

one or a plurality of ultraviolet (UV) light-emitting diode (LED) modules provided around the internal cavity, wherein each of the one or the plurality of UV LED modules has a light-emitting side facing the internal cavity; and a switch control module connected to the one or the plurality of UV LED modules, wherein the switch control module comprises a signal modulator, the signal modulator sets a plurality of gradually increased power levels or a plurality of gradually decreased power levels between a first level and a second level, and gradually modulates an irradiation power of the one or the plurality of UV LED modules from the first level to the second level through the plurality of gradually increased power levels or through the plurality of gradually decreased power levels.

3. The slow-start UV nail lamp of claim 2, wherein the signal modulator is a pulse width modulator (PWM), the pulse width modulator adjusts a duty cycle or a frequency of a current output during a time period in order to increase the irradiation power continuously, and after the time period ends, the pulse width modulator keeps the irradiation power at a constant level or reduces the irradiation power to zero.

4. The slow-start UV nail lamp of claim 2, wherein the signal modulator is a pulse width modulator (PWM), the pulse width modulator adjusts a duty cycle or a frequency of a current output during a time period in order to reduce the irradiation power continuously, and after the time period ends, the pulse width modulator keeps the irradiation power at a constant level or reduces the irradiation power to zero.

5. The slow-start UV nail lamp of claim 2, wherein the signal modulator is an amplitude modulator, the amplitude modulator adjusts a magnitude and a duration of a current output during a time period in order to increase the irradiation power continuously, and after the time period ends, the amplitude modulator keeps the irradiation power at a constant level or reduces the irradiation power to zero.

6. The slow-start UV nail lamp of claim 2, wherein the signal modulator is an amplitude modulator, the amplitude modulator adjusts a magnitude and a duration of a current output during a time period in order to reduce the irradiation power continuously, and after the time period ends, the amplitude modulator keeps the irradiation power at a constant level or reduces the irradiation power to zero.

7. A switch control module of a UV nail lamp, wherein the switch control module is provided on the UV nail lamp and is connected to an ultraviolet (UV) light-emitting diode (LED) module of the UV nail lamp to control an irradiation power of the UV LED module, the switch control module comprising a power buffer unit, wherein when the switch control module is triggered, an output of the switch control module is loaded on the power buffer unit in order for the power buffer unit to change the irradiation power of the UV LED module gradually from a first level to a second level over a time period, wherein the power buffer unit is a resistor-capacitor (RC) circuit, or a resistor-inductor (RL) circuit.

8. A switch control module of a UV nail lamp, wherein the switch control module is provided on the UV nail lamp and is connected to an ultraviolet (UV) light-emitting diode (LED) module of the UV nail lamp to control an irradiation power of the UV LED module, the switch control module comprising a signal modulator, the signal modulator sets a plurality of gradually increased power levels or a plurality of gradually decreased power levels between a first level and a second level, and gradually modulates an irradiation power of the one or the plurality of UV LED modules from the first level to the second level through the plurality of gradually increased power levels or through the plurality of gradually decreased power levels.

9. The switch control module of claim 8, wherein the signal modulator is a pulse width modulator (PWM), the pulse width modulator adjusts a duty cycle or a frequency of a current output during a time period in order to increase the irradiation power continuously, and after the time period ends, the pulse width modulator keeps the irradiation power at a constant level or reduces the irradiation power to zero.

10. The switch control module of claim 8, wherein the signal modulator is a pulse width modulator (PWM), the pulse width modulator adjusts a duty cycle or a frequency of a current output during a time period in order to reduce the irradiation power continuously, and after the time period ends, the pulse width modulator keeps the irradiation power at a constant level or reduces the irradiation power to zero.

11. The switch control module of claim 8, wherein the signal modulator is an amplitude modulator, the amplitude modulator adjusts a magnitude and a duration of a current output during a time period in order to increase the irradiation power continuously, and after the time period ends, the amplitude modulator keeps the irradiation power at a constant level or reduces the irradiation power to zero.

12. The switch control module of claim 8, wherein the signal modulator is an amplitude modulator, the amplitude modulator adjusts a magnitude and a duration of a current output during a time period in order to reduce the irradiation power continuously, and after the time period ends, the amplitude modulator keeps the irradiation power at a constant level or reduces the irradiation power to zero.

* * * * *